(12) United States Patent
Arai et al.

(10) Patent No.: US 6,191,558 B1
(45) Date of Patent: Feb. 20, 2001

(54) BATTERY CONTROLLER AND JUNCTION BOX WITH THE SAME BATTERY CONTROLLER

(75) Inventors: Yoichi Arai; Syuji Satake, both of Shizuoka-ken (JP)

(73) Assignee: Yazaki Corporation, Tokyo (JP)

( * ) Notice: Under 35 U.S.C. 154(b), the term of this patent shall be extended for 0 days.

(21) Appl. No.: 09/522,170

(22) Filed: Mar. 9, 2000

(30) Foreign Application Priority Data

Mar. 12, 1999 (JP) .................................................. 11-067540

(51) Int. Cl.[7] .......................................................... H02J 7/00
(52) U.S. Cl. ............................................ 320/132; 320/130
(58) Field of Search ..................................... 320/132, 130, 320/104, 107; 307/64

(56) References Cited

U.S. PATENT DOCUMENTS

| | | | |
|---|---|---|---|
| 5,717,310 | * | 2/1998 | Sakai et al. ............................. 320/134 |
| 5,796,175 | * | 8/1998 | Itoh et al. ............................... 307/64 |
| 5,952,813 | * | 9/1999 | Ochiai .................................... 320/104 |

FOREIGN PATENT DOCUMENTS 9-128080    5/1997   (JP) .

* cited by examiner

*Primary Examiner*—Peter S. Wong
*Assistant Examiner*—Lawrence Luk
(74) *Attorney, Agent, or Firm*—Finnegan, Henderson, Farabow, Garrett & Dunner, L.L.P.

(57) ABSTRACT

A junction box includes a battery controller. The battery controller includes a high voltage battery remaining capacity measuring portion, a low voltage battery remaining capacity measuring portion and a charging instruction portion. The high voltage battery remaining capacity measuring portion collects predetermined plural pairs of voltage value and current value, obtains an approximate straight line on current-voltage coordinates based on the predetermined plural pairs of the data according to least square method, and then obtains a voltage value based on the approximate straight line and a predetermined current value so as top estimate a remaining capacity of the high voltage battery. The low voltage battery remaining capacity measuring portion collects predetermined plural pairs of voltage value and current value, obtains an approximate straight line on current-voltage coordinates based on the predetermined plural pairs of the data according to least square method, and then obtains a voltage value based on the approximate straight line and a predetermined current value so as to estimate a remaining capacity of the low voltage battery. The charging instruction portion dispatches an instruction for charging the high voltage battery and low voltage battery when it is determined that the remaining capacity of each of the high voltage battery and low voltage battery is below a predetermined value.

3 Claims, 6 Drawing Sheets

BATTERY CONTROLLER AND JUNCTION BOX WITH THE SAME BATTERY CONTROLLER

BACKGROUND OF THE INVENTION

1. Field of the Invention

The present invention relates to a junction box for connecting a power supply to a load and a battery controller provided inside thereof, and more particularly to a battery controller capable of measuring a remaining capacity of each of a low voltage battery and a high voltage battery at the same time and further control timing for charging these batteries.

2. Description of the Related Art

Recently, some types of vehicles contain a high voltage battery of 36 V and a low voltage battery of 12 V. In such a vehicle, charging of the high voltage battery and low voltage battery is controlled by a battery controller provided in the junction box, which connects a vehicle power supply to its load.

The aforementioned high voltage battery is charged with 42 V by an alternator connected to an engine. Then, electric power from this high voltage is supplied to the junction box. The voltage from this high voltage battery is supplied to the load. The junction box includes a DC-DC converter for converting a voltage from the high voltage battery to a low voltage of DC14 V. This DC14 V voltage is supplied to the load and further the low voltage battery so that the low voltage battery is charged.

Generally, the junction box which connects a vehicle power supply to the load is disposed nearest the power supply. It is preferable that the remaining capacity of each of the low voltage battery and high voltage battery is obtained within this junction box.

However, the main role of a conventional battery controller provided in the junction box is to control charging of electric power to the high voltage battery and low voltage battery.

That is, the conventional battery controller has a problem that although it is disposed at a position enabling to measure the remaining capacities of both the batteries accurately, that battery controller does not measure the remaining capacity.

A method for estimation of the remaining capacity of the battery, which has been carried out at other place than the junction box conventionally is based on current accumulation method. That is, according to this method, a preliminarily charged electric amount is known and an amount of current that has already flown is subtracted from that original amount. However, this method is not capable of coping with a case where the battery is replaced during use.

Further, the conventional vehicle's remaining capacity measuring method is measurement of the remaining capacity of a single kind of the battery, and therefore, there is a problem that the conventional measuring method cannot measure the remaining capacities of plural kinds of the batteries which are often seen in recent vehicles.

SUMMARY OF THE INVENTION

Accordingly, the present invention has been achieved to solve the above problems, and therefore, it is an object of the invention to provide a battery controller having a remaining capacity measuring function capable of measuring a remaining capacity of each battery in a junction box accurately even if plural kinds of batteries are loaded on a vehicle and some of the batteries are replaced.

To achieve the above object, there is provided a battery controller contained in a junction box which is provided between a high voltage battery and a load and includes a high voltage system portion which receives a predetermined high voltage from the high voltage battery and supplies to the load and a low voltage system portion which generates a predetermined low voltage based on the predetermined high voltage and supplies to a low voltage battery and the load, the battery controller comprising: a remaining capacity measuring means for collecting predetermined plural pairs of voltage value and current value for each of the high voltage system portion and the low voltage system portion, obtaining an approximate straight line on current-voltage coordinates based on the predetermined plural pairs of the data according to least square method and then obtaining a voltage value based on the approximate straight line and a predetermined current value so as to estimate a remaining capacity of each of the high voltage battery and the low voltage battery; and a means for dispatching an instruction for charging the high voltage battery and the low voltage battery when it is determined that the remaining capacity of each of the high voltage battery and the low voltage battery estimated by the remaining capacity measuring means is below a predetermined value.

According to a preferred embodiment of the present invention, the remaining capacity measuring means collects predetermined plural pairs of the voltage value and the current value for each of the high voltage system portion and the low voltage system portion, averages each of the voltage value and the current value so as to obtain a pair of averaged voltage value and averaged current value, and repeats the processing until a predetermined number of each of the averaged voltage value and the averaged current value is collected so as to obtain an approximate straight line on the current-voltage coordinates according to the least square method, based on data on the predetermined number of pairs of the averaged voltage value and the averaged current value.

Further, to achieve the above object, according to another aspect of the invention, there is provided a junction box provided between a high voltage battery and a load, on which a predetermined high voltage is applied from a high voltage battery, comprising: a high voltage system portion which receives a high voltage from the high voltage battery and supplies to the load; a low voltage system portion which generates a predetermined low voltage based on the predetermined high voltage and supplies to a low voltage battery and the load; a high voltage system power component detecting means for detecting a voltage value and a current value in the high voltage system portion; a low voltage system power component detecting means for detecting a voltage value and a current value in the low voltage system portion; a high voltage battery remaining capacity measuring means for collecting predetermined plural pairs of voltage and the current value based on the voltage value and current value detected by the high voltage system power component detecting means, obtaining an approximate straight line on current-voltage coordinates according to least square method based on the predetermined plural pairs of the data, and obtaining a voltage value according to the approximate straight line and a predetermined current value so as to estimate a remaining capacity of the high voltage battery; a low voltage battery remaining capacity measuring means for collecting predetermined plural pairs of voltage value and current value based on the voltage value and current value detected by the low voltage system power component detecting means, obtaining an approximate straight line on current-voltage coordinates according to least square method based on the predetermined plural pairs of the data, and obtaining a voltage value according to the approximate straight line and a predetermined current value so as to estimate a remaining capacity of the low voltage battery; and a means for dispatching an instruction for charging the high voltage battery and the low voltage battery when it is determined that the remaining capacity of each of the high voltage battery and the low voltage battery estimated by the high voltage battery remaining capacity measuring means and the low voltage battery remaining capacity measuring means is below a predetermined value.

The nature, principle and utility of the invention will become more apparent from the following detailed description when read in conjunction with the accompanying drawings.

DESCRIPTION OF THE PREFERRED EMBODIMENTS

According to the embodiments, a battery controller including a remaining capacity measuring unit capable of measuring the remaining capacities of two battery systems for high voltage and low voltage at the same time is provided in a junction box for connecting a vehicle power supply to a load.

(First Embodiment)

Figure 1:
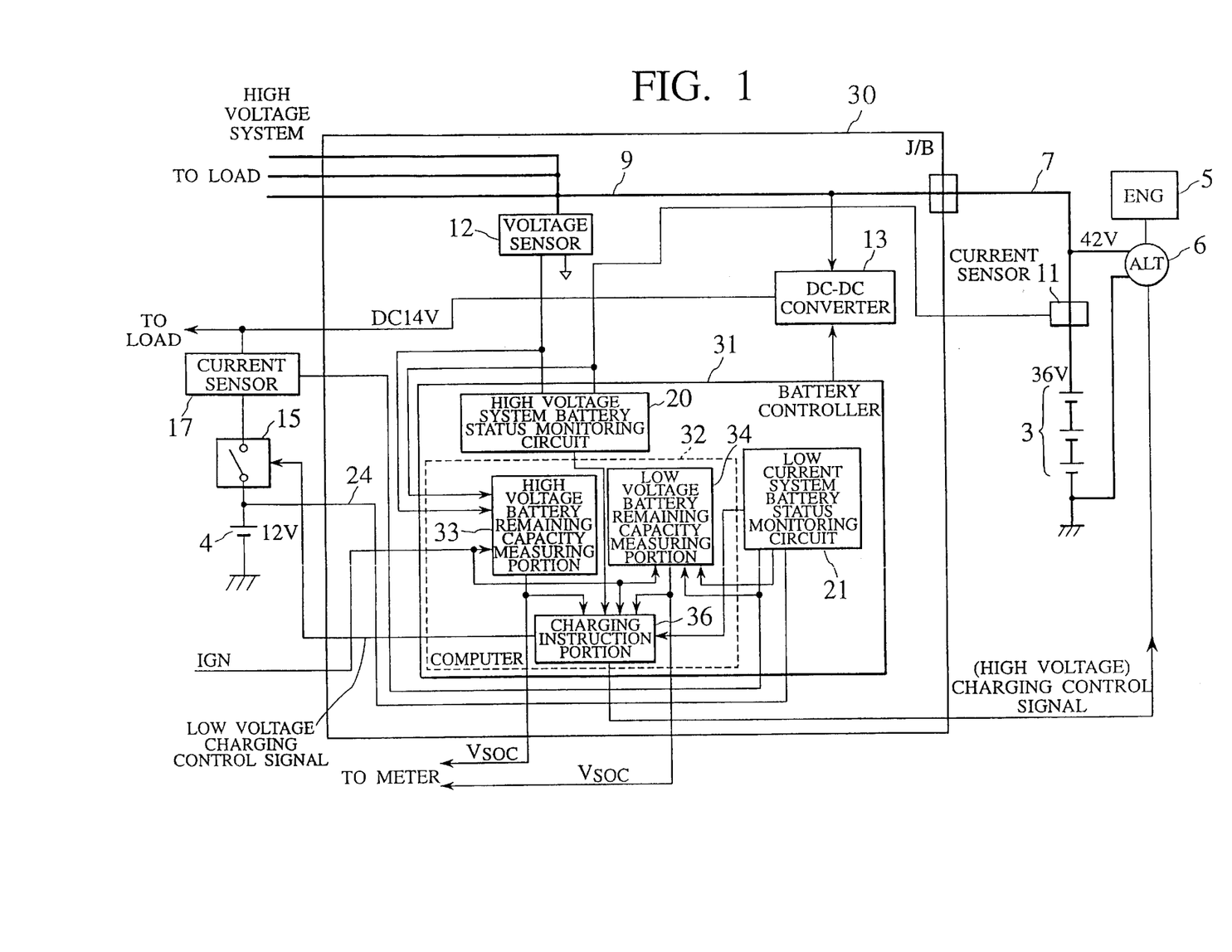
FIG. 1 is a schematic structure diagram of a battery controller according to a first embodiment.

FIG. 1 is a schematic structure diagram of a battery controller according to a first embodiment. A junction box 30 shown in FIG. 1 is provided between a high voltage battery 3 to be charged with 42 V by an alternator 6 connected directly to an engine 5, and a load (not shown) and a low voltage battery 4 like a conventional junction box.

An electric power is supplied from the high voltage battery 3 to a high voltage system pattern 9 of the junction box 30 via a cable 7.

A current sensor 11 and an insulation type voltage sensor 12 are provided on the pattern 9 for high voltage system. Further, a DC-DC converter 13 for converting from a high voltage (36 V) to a low voltage of DC14 V is connected to the high voltage system pattern 9. This DC14 V voltage is supplied to the battery 4 and consequently, the low voltage battery 4 is charged.

A charging circuit 15 is connected to the low voltage battery 4 (12 V) and a current sensor 17 is further connected thereto via the charging circuit 15 and a voltage sensing pattern 24 for transmitting a voltage from the low voltage battery 4 is connected to the low voltage battery 4 (12 V).

On the other hand, the battery controller 31 comprises a high voltage system battery status monitoring circuit 20 for monitoring the status of the high voltage battery 3 (voltage) based on the output values of the current sensor 11 and voltage sensor 12 and a low current system battery status monitoring circuit 21 for monitoring the status of the low voltage battery 4 (voltage) based on the output values of the current sensor 17 and low voltage sensing pattern 24. The battery controller 30 is provided with a converter control means (not shown) for stabilizing the output by turning ON/OFF a switching element (not shown) of the DC-DC converter 13.

According to this embodiment, a computer 32 for starting charging of an electric power to the high voltage battery 3 and low voltage battery 4 based on an output signal from the monitoring circuits and estimated remaining capacities of the high voltage battery 3 and low voltage battery 4 is provided.

This computer 32 contains a high voltage battery remaining capacity measuring portion 33, a low voltage battery remaining capacity measuring portion 34 and a charging instruction portion 36.

The high voltage battery remaining capacity measuring portion 33 samples output values of (voltage, current) the voltage sensor 12 and current sensor 11 provided in the high voltage system every $500\mu$ seconds when the ignition is ON and during a traveling of a vehicle and then averages the voltage value data and current value data each time when eight pairs thereof are collected. Then, 100 pairs of the averaged voltage value data and current value data are collected and plotted on current-voltage coordinates. Then, a relation between the voltage value data and current value data is approximated by a straight line (Y=a·X+b). A voltage value at an intersection between this approximating line and a line of −10A is regarded as an estimated voltage (remaining capacity) of the current high voltage battery 3 and this is transmitted to and displayed on a display portion (not shown).

The low voltage battery remaining capacity measuring portion 34 samples an output value of the current sensor 17 provided on the low voltage battery 4 and an output value (voltage) from a dividing circuit (not shown) provided in the low current system battery status monitoring circuit 21 every $500\mu$ seconds when the ignition is ON and during a traveling of the vehicle, and then averages the voltage value data and current value data each time when eight pairs thereof are collected. 100 pairs of the averaged voltage value data and current value data are collected and plotted on current-voltage coordinates. Then, a relation between the voltage value data and current value data is approximated by a straight line (Y=a·X+b). A voltage at an intersection between this approximating line and a line of −10A is regarded as an estimated voltage (remaining capacity) of the low voltage battery 4 and this is transmitted to and displayed on the display portion (not shown).

The charging instruction portion 36 transmits a charging control signal to the charging circuit 15 to charge the low voltage battery 4 when the low current system battery status monitoring circuit 21 determines that the low voltage battery 4 possesses a voltage lower than a predetermined voltage (for example, 12 V).

When the high voltage system battery status monitoring circuit 20 determines that the high voltage battery 3 possesses a voltage lower than a predetermined voltage (for example, 36 V), the charging instruction portion 36 transmits a charging control signal to the charging circuit 15 to charge the low voltage battery 4.

Figure 2:
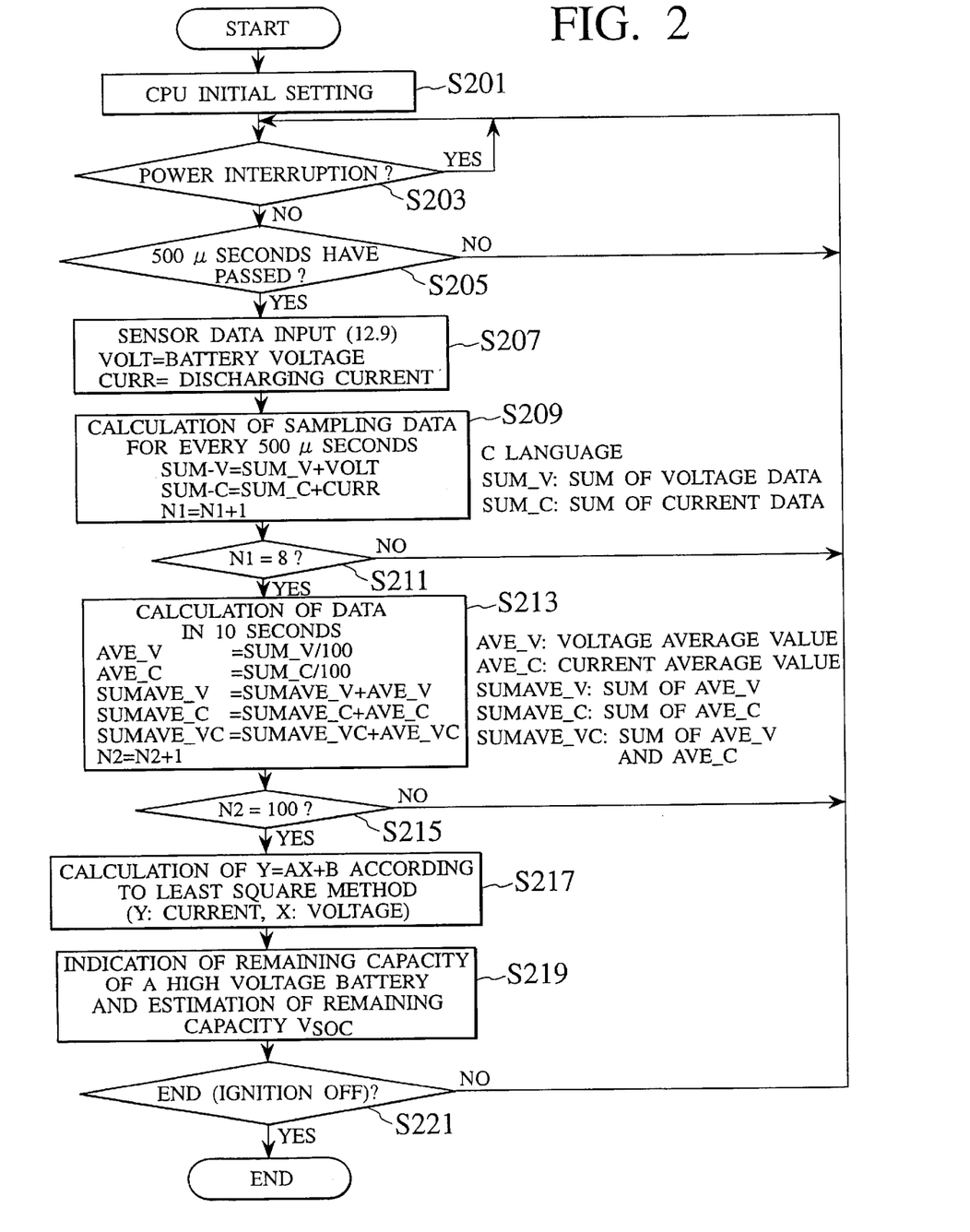
FIG. 2 is a flow chart for explaining an operation of a high voltage battery remaining capacity measuring portion.

An operation of the battery controller having such a structure will be described. FIG. 2 is a flow chart for explaining an operation of the high voltage battery remaining capacity measuring portion.

With an operation of the ignition key, first, the computer 32 checks respective parts and carries out initial setting such as memorizing of a program in ROM (not shown) in RAM (S201). Then, whether or not the vehicle is stopped is determined (S203). As for determining whether or not the vehicle is stopped, if a load operating signal (not shown) is produced, for example, when an accelerator operating amount, speed pulse amount, wiper rotation amount or the like is over a predetermined amount or when an air conditioner compressor or the like is carrying out switching operation, it is determined that the vehicle is running and if there is no output, it is determined that it is stopped.

Next, if the vehicle is not stopped or it is determined that it is running, whether or not 500μ seconds have passed is determined (S205). If 500μ seconds have passed, a voltage value (VOLT) detected by the voltage sensor 12 provided on the high voltage system and a current value (CURR) detected by the current sensor 11 are read (S207). The voltage values and current values are filtered and converted to digital values.

If further 500μ seconds have passed, another voltage value of the voltage sensor 12 and another current value of the current sensor 11 are read and added to last data thereof (S209). The processing of reading data every 500μ seconds and adding to last data is repeated and whether or not addition of eight pairs of the data is finished is determined (S211).

If addition of eight pairs of the data is finished in step S211, voltage data and current data obtained by adding eight pairs of the data is divided by 8 to average the data (S213). This averaged voltage data and current data are plotted on current-voltage coordinates.

Then, 100 pairs of the averaged voltage value data and current value data are obtained (S215).

In step S215, when 100 pairs of the data are completely obtained, a relation between the voltage value data and current value data is approximated by least square method by a straight line (Y=a·X+b) (S217).

Figure 3:
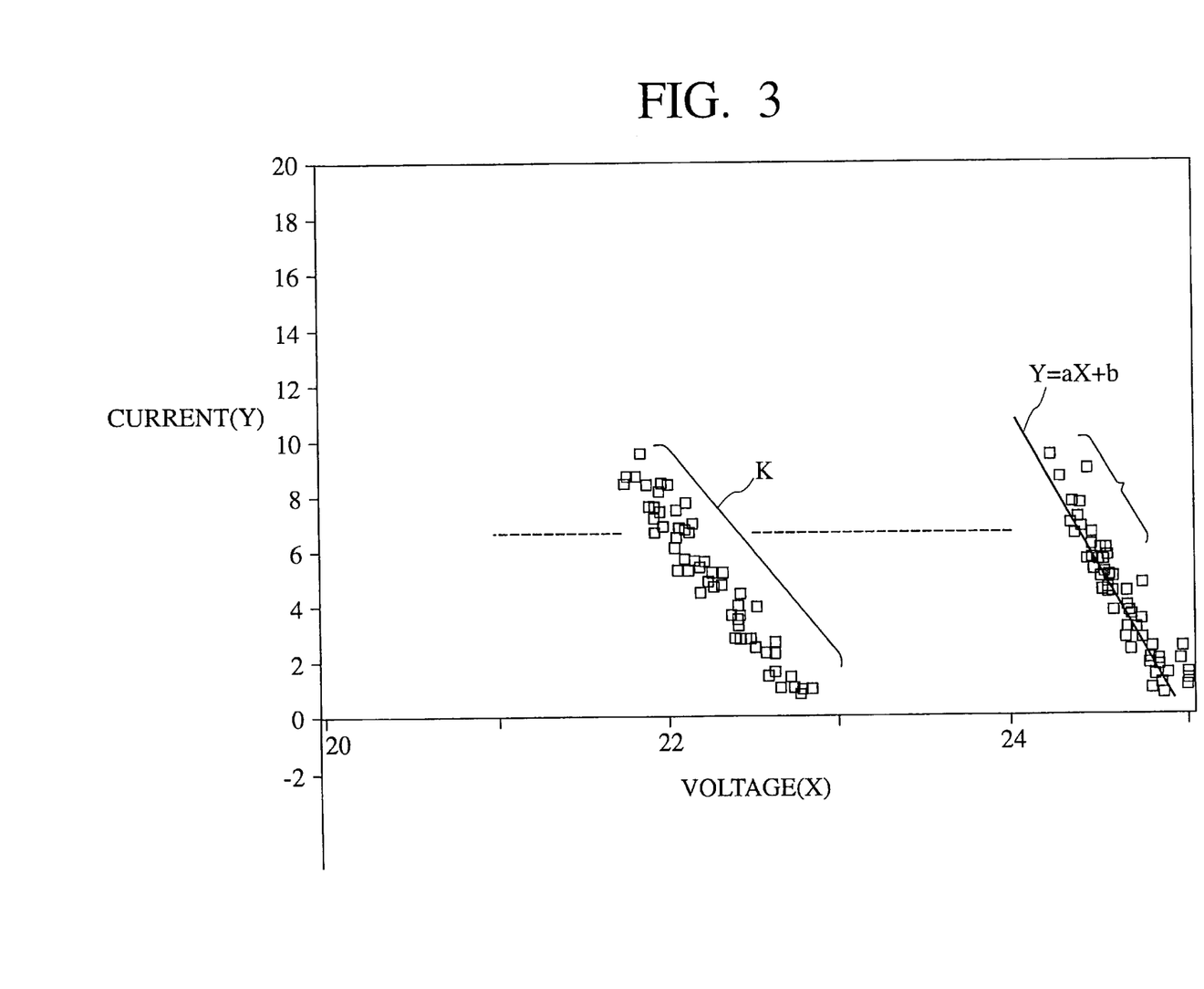
FIG. 3 is an explanatory diagram for explaining average data (voltage value, current value) on current-voltage coordinates.

For example, as shown in FIG. 3, by plotting averaged data of 100 pairs of the data on the voltage-current coordinates (the voltage drops gradually with a passage of time), an approximate line of these data is obtained. That is, if that approximating line is defined as Y=a·X+b, its coefficients a and b are obtained.

These coefficients a and b are obtained according to a following general least square method.

If summation of squares of an error between a measured data and the approximate line is regarded as S, an expression (1) is established.

$$S = \sum_{i=1}^{n} \{Yi - (a \cdot Xi + b)\}^2 \quad (1)$$

If the expression (1) is differentiated by a and b and respective results are assumed to be 0, expressions (2), (3) are established.

$$\partial S/\partial a = 2\sum_{i=1}^{n} Xi \cdot b + 2\sum_{i=1}^{n} Xi^2 \cdot a - 2\sum_{i=1}^{n} XiYi = 0 \quad (2)$$

$$\partial S/\partial b = 2\sum_{i=1}^{n} b + 2\sum_{i=1}^{n} Xi \cdot a - 2\sum_{i=1}^{n} Yi = 0 \quad (3)$$

From the expressions (2), (3), a and b are obtained as the following expressions (4), (5).

$$a = \frac{\sum_{i=1}^{n} XiYi - \left(\sum_{i=1}^{n} Xi \sum_{i=1}^{n} Yi\right)/n}{\sum_{i=1}^{n} Xi^2 - \left(\sum_{i=1}^{n} Xi\right)^2/n} \quad (4)$$

$$b = \sum_{i=1}^{n} Yi/n - \sum_{i=1}^{n} Xi(a/n) \quad (5)$$

Then, a predetermined charging current value is substituted for the linear expression (Y=a·X+b) obtained in the above manner to obtain a corresponding voltage value (S217).

Figure 4A:
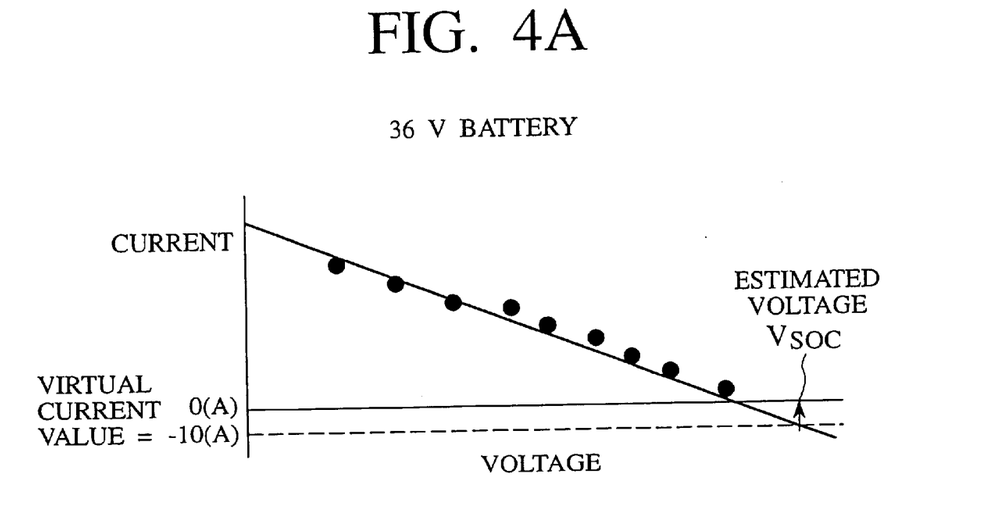
FIGS. 4a and 4b are explanatory diagrams for explaining a method for estimating the remaining capacities of two battery systems for high voltage and low voltage.

For example, as shown in FIG. 4A, a predetermined virtual current value (−10A) is substituted for the approximate line (Y=a·X+b) to obtain a voltage value at that time and that value is regarded as an estimated voltage (VSOC) corresponding to a remaining capacity of the current 36 V battery 3 (S219). This estimated voltage (VSOC) is displayed on the display portion.

Next, whether or not ignition is turned OFF is determined (S221) and if the ignition is not turned OFF, the processing is returned to the aforementioned step S203, in which the above processing is repeated.

On the other hand, the low voltage battery remaining capacity measuring portion 34 obtains a remaining capacity of the low voltage battery 4 disposed in the downstream of the junction box 30 by a processing described below like the aforementioned high voltage system.

Figure 5:
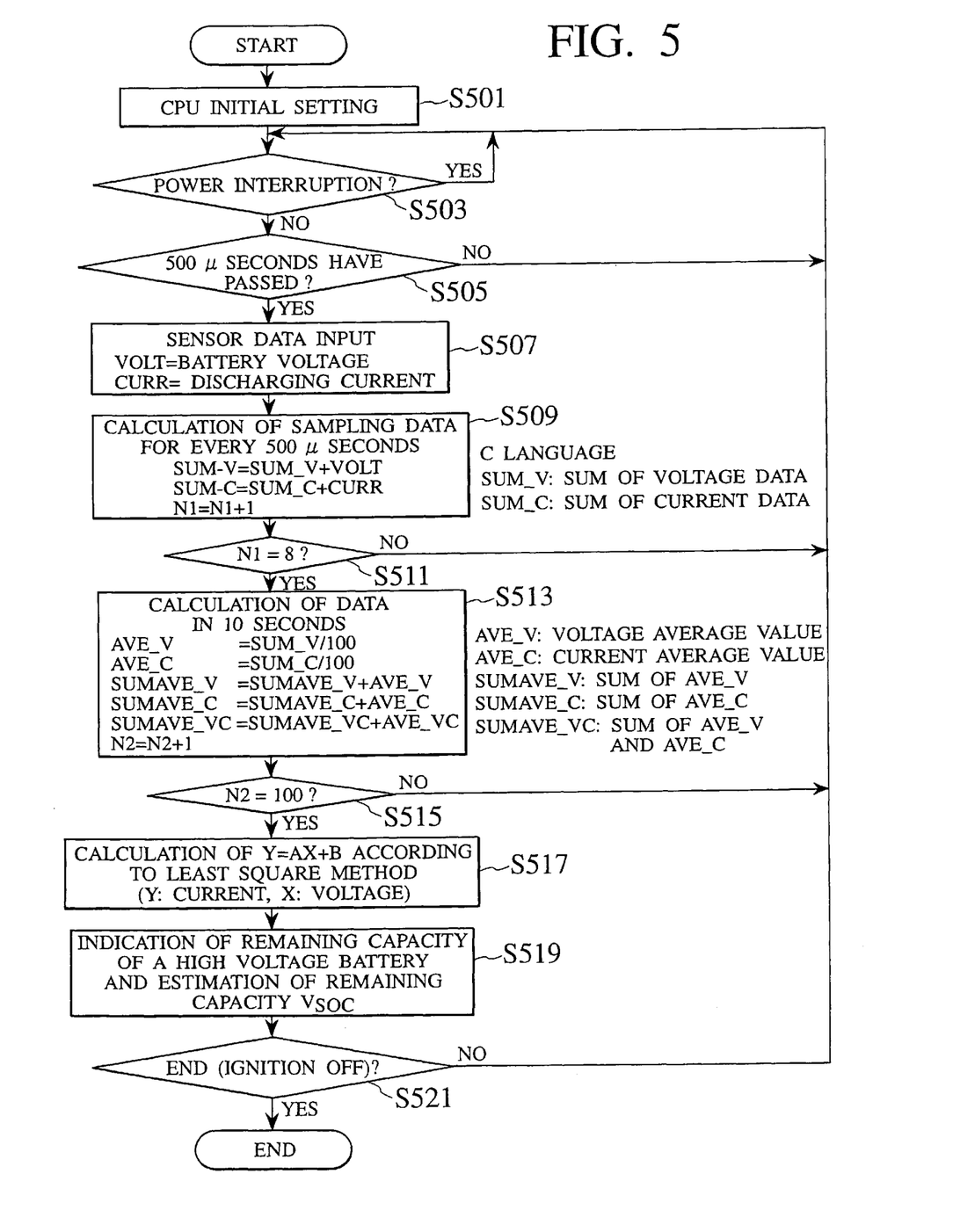
FIG. 5 is a flow chart for explaining an operation of a low voltage battery remaining capacity measuring portion.

FIG. 5 is a flow chart for explaining an operation of the low voltage battery remaining capacity measuring portion.

With an operation of the ignition key, first, the computer 32 checks respective parts and carries out initial setting such as memorizing a program in ROM (not shown) in RAM (S501). Then, whether or not the vehicle is stopped is determined (S503). As for determining whether or not the vehicle is stopped, for example, if a load operating signal (not shown) is produced when an accelerator operating amount, speed pulse amount, wiper rotation amount or the like is over a predetermined amount or when the air conditioner compressor or the like is carrying out switching operation, it is determined that the vehicle is running and if there is no output, it is determined that the vehicle is stopped.

Next, if the vehicle is not stopped or it is determined that the vehicle is running, whether or not 500μ seconds have passed is determined (S505). If 500μ seconds have passed, a current value (CURR) detected by the current sensor 17 provided in the low voltage battery and a voltage value (VOLT) of the low voltage battery 4 obtained by the low voltage sensing pattern 29 are read (S507). The voltage value and current value are filtered and converted to digital values.

If further 500μ seconds have passed, another voltage and current values are read and added to last data thereof (S509). The processing of reading the data every 500μ seconds and adding to last data is repeated and whether or not addition of eight pairs of the data is finished is determined (S511).

If addition of the eight pairs of the data is finished in step S511, the voltage value data and current value data obtained by adding eight pairs of the data are divided by 8 each to obtain their average values (S513). These averaged voltage data and current data are plotted on current-voltage coordinates.

Then, 100 pairs of the averaged voltage data and current data are obtained (S515).

When the 100 pair of the data are completely obtained in step S515, a relation between the voltage value data and current value data is approximated by a straight line (Y=a·X+b) according to the least square method (S517).

For example, the averaged data of 10 pairs are plotted on the voltage-current coordinates as shown in FIG. 3 like the above high voltage system (the voltage drops with a passage of time) so as to obtain an approximated straight line of these data. That is, if the approximated straight line is defined as Y=a·X+b, its coefficients a and b are obtained.

Because the method for obtaining these coefficients a and b is the same as the aforementioned method, a description thereof is omitted.

A predetermined discharging current value is substituted for the linear expression (Y=a·X+b) obtained in the above way so as to obtain a corresponding voltage value (S517).

Figure 4B:
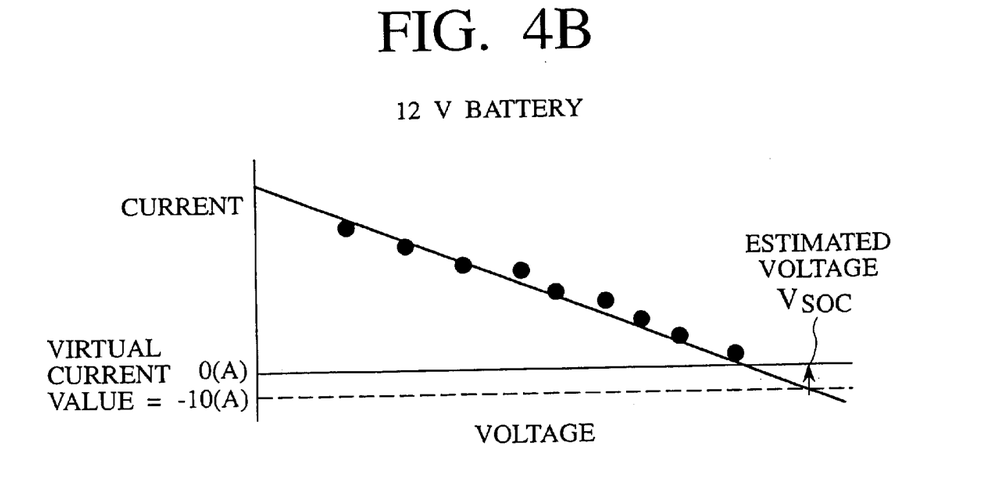

For example, a predetermined virtual current value (−10 A) is substituted for the approximated straight line (Y=a·X+b) as shown in FIG. 4B, a voltage value at that time is obtained and that value is regarded as an estimated voltage (VSOC) corresponding to a remaining capacity of the current 36 V battery 3 (S519). This estimated voltage (VSOC) is displayed on the display portion.

Next, whether or not the ignition is turned OFF is determined (S521) and if the ignition is not turned OFF, the processing is returned to the aforementioned step S503, in which the above described processing is repeated.

Although in the above respective embodiments, the sampling cycle is 500μ seconds and every eight pairs are averaged, it is permissible to sample at every 1 millisecond and average every 100 pairs and then obtain an approximated straight line when 100 averaged pair data are collected.

Further, it is also permissible to memorize a remaining capacity just before the ignition is turned OFF and indicate a remaining capacity memorized at a last ignition OFF when a next ignition is turned ON.
(Second Embodiment)

Figure 6:
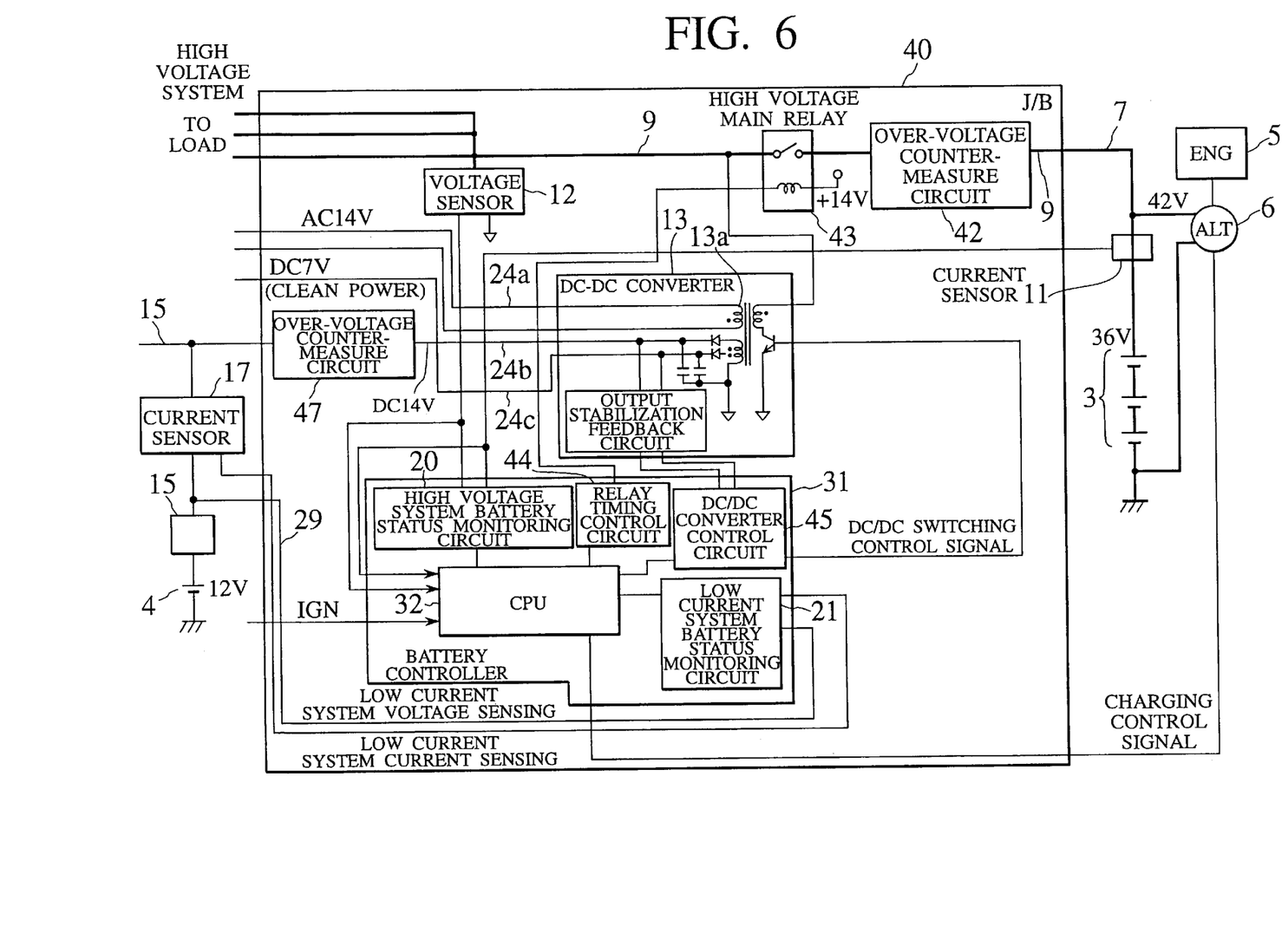
FIG. 6 is a schematic structure diagram of a junction box according to a second embodiment.

The aforementioned battery controller 31 is desired to be provided in the junction box 40 shown in FIG. 6.

The junction box 40 shown in FIG. 6 comprises a over-voltage countermeasure circuit 42 for a high voltage and a high voltage main relay 43, these components being provided on its high voltage system pattern 9.

The over-voltage countermeasure circuit 42 for a high voltage comprises a Zener diode ZD1, a field capacitor C1, a resistor and the like and even if its input turns to an over-voltage exceeding 36 V due to abnormality or the like of the alternator 1, that circuit 42 maintains that output of 36 V.

The DC-DC converter 13 comprises a transformer, diode, capacitor, switching element and the like as shown in FIG. 6 so as to obtain DC14 V (12 V in a low voltage battery), DC7 V, and AC14 V. The AC14 V is realized by not connecting any capacitor, diode or the like to the coil 13a.

This AC14 V is sent out via the pattern 24a connected to an output of the DC-DC converter 13. Further, the DC14 V is sent out to the low voltage battery 4 via the pattern 24b connected to the output of the DC-DC converter 13.

The DC7 V is sent out via the pattern 24c connected to the output of the DC-DC converter 13.

This DC-DC converter 28, and the patterns 24a, 24b, 24c are totally called low voltage system portion.

Like the aforementioned embodiments, the battery controller 31 comprises the high voltage system battery status monitoring circuit 20, low current system battery status monitoring circuit 21 and a computer 32 including high voltage battery remaining capacity measuring portion 33, low voltage battery remaining capacity measuring portion 34, charging instruction portion 36 and the like.

The battery controller 31 further comprises a relay timing control circuit 44 and a DC-DC converter control circuit 45.

The junction box 40 further comprises an over-voltage countermeasure circuit 47 for a low current. The over-voltage countermeasure circuit 47 for a low current comprises diodes D1, D2, field capacitor C2, Zener diode ZD2, resistor, transistor and the like. Even if the DC14 V which is an output from the DC-DC converter 13 turns to be an over-voltage exceeding 14 V due to abnormality of the low voltage battery 4, load or the like, 14 V is always maintained so as to protect the low voltage battery 4, load and DC-DC converter 13.

The DC-DC converter 45 reads voltage values at the 14 V output terminal and 7 V output terminal of the DC-DC converter 13 with an output stabilization feedback circuit and controls the duty ratio of the switching control signal so that this voltage approaches a reference value (14 V, 7 V).
<Description of the Operation>

An operation of the junction box having such a structure will be described below.

The role of the alternator 1 in the power supply system is to supply an electric power to be consumed by an electric load of the vehicle during a running of the engine and further charge the batteries 3, 4 so as to maintain the batteries in excellent charging condition (a sufficient electric amount is maintained for a next engine start).

With ignition ON, the battery controller 31 in the junction box 40 keeps the high voltage main relay 43 OFF in a predetermined interval using the relay-timing controller 44 and after that, turns ON the high voltage main relay 43.

As a result, an electric power from the 36 V battery 3 is supplied to a load (not shown) via the pattern 9, over-voltage countermeasure circuit 42, high voltage main relay 43, current sensor 11 and voltage sensor 12 in the junction box 40.

If a voltage several times 36 V is, supplied due to an abnormality of the load or alternator 6, this over-voltage is suppressed by the over-voltage countermeasure circuit 42 and a stabilized high voltage of 36 V is supplied to the load.

On the other hand, the DC-DC converter 13 inputs a first high voltage from the high voltage main relay 43 to an input terminal so that AC14 V, DC14 V and DC7 V are obtained depending on the number of windings of the coil, capacitor, diode, switching element and the like.

This DC-DC converter 13 is controlled by the battery controller 31.

Further, the battery controller 31 obtains a duty ratio of a controls signal for the switching element in the DC-DC converter 13 based on a detection signal in order to supply the outputs 14 V, 7 V from the DC-DC converter 13 stably so as to turn ON/OFF the switching element.

Further, if the output values of the current sensor 11 and voltage sensor 12 exceeds respective predetermined values, the battery controller 31 determines that it is due to short-circuit of the load or cable and maintains the high voltage main relay 43 OFF and keeps the switching element OFF. That is, the first voltage from the high voltage battery 3 is stopped.

Like the above described embodiments, the computer 32 of the battery controller 31 measures remaining capacities of the battery of the high voltage system and low current system based on voltages and currents of the systems as shown in FIG. 4.

Therefore, the junction box 40 has the control function of the high voltage main relay 43, control function of the DC-DC converter 13, control function of the alternator 1 and battery remaining capacity measuring function (two systems for high and low). Therefore, it is not necessary to provide the load side with any protective circuit for an over-current and a stabilized power distribution to two systems is enabled and the remaining capacities of both the batteries can be measured.

According to the present invention, the battery controller in the junction box collects plural pairs of the voltage value and current value and then obtains an approximate straight line on the current-voltage coordinates based on these plural pairs of the voltage value and current value according to the least square method. The battery controller substitutes a predetermined current value for this approximate straight line so as to obtain a corresponding current value and estimates a high voltage battery remaining capacity from that voltage value. The battery controller also estimates a remaining capacity of the low voltage battery in the same method. When it is determined that the charging amount of the high voltage battery and/or the low voltage battery is below a predetermined value, the battery controller starts charging to the high voltage battery and/or the low voltage battery.

As a result, there is an effect that the remaining capacities of both the low voltage battery and high voltage battery can be obtained highly accurately at the same time in the junction box for connecting the power supply to the load in the vehicle.

Further, there is also an effect that the remaining capacity can be measured accurately even if any one of these batteries is replaced by user.

It should be understood that many modifications and adaptations of the invention will become apparent to those skilled in the art and it is intended to encompass such obvious modifications and changes in the scope of the claims appended hereto.

What is claimed is:

1. A battery controller contained in a junction box which is provided between a high voltage battery and a load and includes a high voltage system portion which receives a predetermined high voltage from said high voltage battery and supplies to said load and a low voltage system portion which generates a predetermined low voltage based on said predetermined high voltage and supplies to a low voltage battery and said load, said battery controller comprising:

a remaining capacity measuring means for collecting predetermined plural pairs of voltage value and current value for each of said high voltage system portion and said low voltage system portion, obtaining an approximate straight line on current-voltage coordinates based on the predetermined plural pairs of the data according to least square method and then obtaining a voltage value based on the approximate straight line and a predetermined current value so as to estimate a remaining capacity of each of said high voltage battery and said low voltage battery; and a means for dispatching an instruction for charging said high voltage battery and said low voltage battery when it is determined that the remaining capacity of each of said high voltage battery and said low voltage battery estimated by the remaining capacity measuring means is below a predetermined value.

2. A battery controller according to claim 1 wherein said remaining capacity measuring means collects predetermined plural pairs of the voltage value and the current value for each of said high voltage system portion and said low voltage system portion, averages each of the voltage value and the current value so as to obtain a pair of averaged voltage value and averaged current value, and repeats the processing until a predetermined number of each of the averaged voltage value and the averaged current value is collected so as to obtain an approximate straight line on the current-voltage coordinates according to the least square method, based on data on the predetermined number of pairs of the averaged voltage value and the averaged current value.

3. A junction box provided between a high voltage battery and a load, on which a predetermined high voltage is applied from a high voltage battery, the box comprising:

a high voltage system portion which receives a high voltage from said high voltage battery and supplies to said load;

a low voltage system portion which generates a predetermined low voltage based on said predetermined high voltage and supplies to a low voltage battery and said load;

a high voltage system power component detecting means for detecting a voltage value and a current value in said high voltage system portion;

a low voltage system power component detecting means for detecting a voltage value and a current value in said low voltage system portion;

a high voltage battery remaining capacity measuring means for collecting predetermined plural pairs of voltage value and current value based on the voltage value and current value detected by the high voltage system power component detecting means, obtaining an approximate straight line on current-voltage coordinates according to least square method based on the predetermined plural pairs of the data, and obtaining a voltage value according to the approximate straight line and a predetermined current value so as to estimate a remaining capacity of said high voltage battery;

a low voltage battery remaining capacity measuring means for collecting predetermined plural pairs of voltage value and current value based on the voltage value and current value detected by the low voltage system power component detecting means, obtaining an approximate straight line on current-voltage coordinates according to least square method based on the predetermined plural pairs of the data, and obtaining a voltage value according to the approximate straight line and a predetermined current value so as to estimate a remaining capacity of said low voltage battery; and a means for dispatching an instruction for charging said high voltage battery and said low voltage battery when it is determined that the remaining capacity of each of said high voltage battery and said low voltage battery estimated by the high voltage battery remaining capacity measuring means and the low voltage battery remaining capacity measuring means is below a predetermined value.

* * * * *

UNITED STATES PATENT AND TRADEMARK OFFICE
CERTIFICATE OF CORRECTION

PATENT NO.   : 6,191,558 B1  
DATED        : February 20, 2001  
INVENTOR(S)  : Yoichi Arai et al.

It is certified that error appears in the above-identified patent and that said Letters Patent is hereby corrected as shown below:

<u>Title page,</u>
Item [57], ABSTRACT,
Line 11, "so as top" should read -- so as to --.

Signed and Sealed this

Ninth Day of April, 2002

Attest:

JAMES E. ROGAN
*Director of the United States Patent and Trademark Office*

*Attesting Officer*